2,837,502
STABLE HIGH-SOLIDS LATICES

Robert S. Hanmer, Borger, and James H. Carroll, Phillips, Tex., assignors to Phillips Petroleum Company, a corporation of Delaware No Drawing. Application April 24, 1953
Serial No. 351,046

9 Claims. (Cl. 260—83.7)

This invention relates to the polymerization of unsaturated organic coumpounds. In one of its more specific aspects, it relates to the polymerization of an aliphatic conjugated diene hydrocarbon, including substituted derivatives, either alone or in admixture with a monomer copolymerizable therewith, to form long chain polymers of the type known as synthetic rubbers. In another of its more specific aspects, it relates to the polymerization of a butadiene-1,3 hydrocarbon and a monomer copolymerizable therewith in an aqueous dispersion. In another of its more specific aspects, it relates to a process for the production of stable latices of high solids content in low temperature emulsion polymerization systems using methanol as the antifreeze for the system with a minor amount of a polyhydric alcohol to improve latex stability and increase conversion rates.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes, such as butadiene (1,3 - butadiene),2,3 - dimethyl - 1,3 - butadiene, isoprene, piperylene, 3-furyl-1,3-butadiene, 3-methoxy-1,3-butadiene, and the like; haloprenes, such as chloroprene (2-chloro-1,3-butadiene, bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylonitrile, methacrylamide, and the like; methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or are copolymerizable with each other in aqueous emulsion and may be polymerized to form linear copolymers.

In normal low temperature emulsion polymerization systems, i. e., systems in which polymerization is effected below 0° C., the reactor solids content is generally in the range between 15 and 20 percent by weight or less. In such systems, the amount of aqueous phase is usually in the range between 150 and 300 or more parts by weight per 100 parts of monomers charged. It is ordinarily agreed that the fluidity of the latex will be affected, at least in part, by the amount of aqueous medium and that the amount of aqueous medium should be sufficiently great that the latex remains fluid and does not become highly viscous or set up as a gelatinous mass. In the production of a high-solids content latex, smaller quantities of aqueous phase must necessarily be employed in order to avoid a long and tedious process of concentrating the latex to the desired solids content at the conclusion of the polymerization. With a decrease in the amount of aqueous phase, difficulties with prefloc formation frequently arise and there is often a marked decrease in conversion rate.

The objects of this invention will be attained by the aspects of this invention.

An object of this invention is to polymerize unsaturated organic compounds. Another object of the invention is to produce an improved high solids synthetic rubber latex. Another object of the invention is to increase the reaction rate in polymerizing unsaturated organic compounds in aqueous emulsion to produce improved high-solids latices. Another object of the invention is to use methanol as the antifreeze agent in combination with a polyhydric alcohol in the polymerization of unsaturated organic compounds in an aqueous emulsion. Another object of the invention is to provide a latex of higher solids at an increased reaction rate by using methanol as an antifreeze agent with a minor amount of glycerol, ethylene glycol or erythritol. Other and further objects of this invention will be apparent upon study of the accompanying disclosure.

Broadly speaking, this invention comprises the use in low-temperature emulsion polymerization recipes of methanol as the antifreeze agent in admixture with glycerol, ethylene glycol or erythritol in aqueous emulsion polymerization of unsaturated organic compounds. Methanol is used in our mixture in a major amount of the alcohol mixture. The polyhydric alcohol is present in a minor amount, for example, in a quantity of 10 to 45 parts by weight per 100 parts of said alcohol mixture.

We have discovered a process for the production of a stable synthetic rubber latex having a reactor solids content of at least 30 percent by weight, and preferably 35 to 40 percent by weight or higher, by emulsion polymerization in aqueous systems at temperatures below 0° C., employing as an antifreeze agent an alcohol mixture in an amount of up to 50 percent and preferably 10 to 50 weight percent of the total aqueous phase, the mixture consisting essentially of a major amount of methanol and a minor amount, such as 10 to 45, preferably 10 to 35 percent by weight of glycerol, ethylene glycol or erythritol or a mixture thereof. The alcohols are charged to the system prior to polymerization. The amount of aqueous phase, including both the methanol and selected polyhydric alcohol, is in the range of 50 to 160 parts by weight per 100 parts of monomers and is preferably less than 125 parts. The amount of methanol employed is sufficient to prevent freezing of the aqueous phase and is a major portion of the alcohol mixture, generally at least 55 weight percent of the alcohol mixture and preferably in the range of 65 to 90 weight percent of the alcohol mixture.

Polymerization is effected at the desired temperature until a conversion generally as high as 75 percent, and preferably higher, is reached. At the conclusion of the polymerization, the reaction is shortstopped, and antioxidant is added, and unreacted monomers are removed by a stripping operation, such as steam stripping. Methanol is also removed in the same manner. The selected polyhydric alcohol charged remains in the latex. The solids content of the latex is dependent to a large extent upon the degree of conversion, if other factors are kept constant.

When operating in this manner, latices are obtained which are free from prefloc, the conversion rate is higher than in similar systems containing methanol alone as the antifreeze agent, and latices are produced which have a higher solids content at a given conversion than are ordinarily obtained.

The process of this invention is particularly applicable for the production of synthetic rubber latices to be used as such. Polymerization temperatures which are applicable are in the range of between −40 and 0° C. The synthetic rubber latices produced by the processes of this invention are especially useful for the production of foam sponge, for the manufacture of latex base paints, and for various latex dipping operations. If the latex obtained by direct polymerization does not have as high a solids content as desired, it can be concentrated by any suitable conventional means.

While polymerizations in the presence of glycerol or other selected polyhydric alcohol alone as the antifreeze agent can be carried out successfully, such operation introduces numerous industrial problems. Recovery of the glycerol or other higher boiling alcohol is very difficult, if not impossible, and therefore, its use in larger amounts introduces a serious economic disadvantage. Furthermore, latices containing considerable amounts of glycerol or other polyhydric alcohol are unsuitable for many applications in which they might otherwise be useful, such as, for example, in latex base paints, certain dipping operations, and the like.

The process of this invention is particularly effective when the monomeric material polymerized is a polymerizable aliphatic conjugated diene or a mixture of such a conjugated diene with lesser amounts of one or more other compounds, containing an active $CH_2=C<$ group, which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing disclosure, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 20:80 and 95:5 by weight.

It is generally preferred that the emulsion be of an "oil-in-water" type, with the ratio of aqueous medium to monomeric material between 0.5:1 to 1.6:1, in parts by weight.

Emulsifying agents which are applicable in these low temperature polymerizations are materials such as potassium laurate, potassium oleate, potassium myristate, potassium stearate, and the like, and salts of rosin acids. Mixtures of potassium fatty acid soaps with sodium fatty acid soaps and with rosin soaps are also applicable. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred, except when a polyamino compound is used as a reductant, in which case a somewhat higher pH should usually be used.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Various combinations of oxidants and reductants are commonly used in the low temperature emulsion polymerization systems and such conventional materials are also used in the recipes utilized in connection with this invention.

The following example is set forth as being exemplary and is not meant to unduly limit the invention.

*Example*

Two runs were made at −10° C. in an emulsion polymerization system containing methanol. In each case ten parts of glycerol was added per 100 parts of monomers. The following recipes were employed:

|  | Parts by weight | |
| --- | --- | --- |
|  | Run 1 | Run 2 |
| Water | 106 | 90 |
| Methanol | 24 | 20 |
| Glycerol | 10 | 10 |
| Butadiene | 85 | 85 |
| Styrene | 15 | 15 |
| K-ORR soap [1] | 4.0 | 4.0 |
| KOH | 0.05 | 0.05 |
| $Na_4P_2O_7$ | 0.204 | 0.204 |
| $FeSO_4.7H_2O$ | 0.210 | 0.210 |
| Daxad 11 [2] | 0.2 | 0.2 |
| Diisopropylbenzene hydroperoxide | 0.145 | 0.145 |
| Mercaptan blend [3] | 0.10 | 0.10 |

[1] Potassium Office Rubber Reserve soap.
[2] Sodium salt of condensed alkyl aryl sulfonic acid.
[3] A blend of tertiary $C_{12}$, $C_{14}$, and $C_{16}$ aliphatic mercaptans in a ratio of 3:1:1 parts by weight.

Boosters were added during the polymerization. The amounts of materials added, time of addition, solids content, and final results are presented below.

|  | Run 1 | | | Run 2 | | |
| --- | --- | --- | --- | --- | --- | --- |
|  | 1 | 2 | 3 | 1 | 2 | 3 |
| Water | 5.0 | 5.0 | 5.0 | 5.0 | 5.0 | 5.0 |
| $Na_4P_2O_7$ | 0.102 | 0.102 | 0.102 | 0.102 | 0.102 | 0.102 |
| $FeSO_4.7H_2O$ | 0.105 | 0.105 | 0.105 | 0.105 | 0.105 | 0.105 |
| Diisopropylbenzene hydroperoxide | 0.072 | 0.072 | 0.072 | 0.072 | 0.072 | 0.072 |
| Time, hours | 4.6 | 7.5 | 16.9 | 7.2 | 8.4 | 16.6 |
| Solids, percent | 22.5 | 26 | 31.5 | 27 | 31 | 34.6 |
| Conversion, percent | 50 | 63 | 76 | 57 | 66 | 76 |
| Final time, hours |  | 18 |  |  | 18 |  |
| Final solids, percent |  | 32 |  |  | 35 |  |
| Final conversion, percent |  | 77 |  |  | 78 |  |

Two runs were made at −10° C. in an emulsion polymerization system containing methanol but no glycerol. The following recipes were employed:

|  | Parts by weight | |
|---|---|---|
|  | Run 3 | Run 4 |
| Water | 112 | 96 |
| Methanol | 28 | 24 |
| Butadiene | 85 | 85 |
| Styrene | 15 | 15 |
| K-ORR soap | 4.0 | 4.0 |
| KOH | 0.05 | 0.05 |
| Daxad 11 | 1.0 | 1.0 |
| Na$_4$P$_2$O$_7$ | 0.136 | 0.204 |
| FeSO$_4$.7H$_2$O | 0.140 | 0.210 |
| Diisopropylbenzene hydroperoxide | 0.097 | 0.145 |
| Mercaptan blend | 0.10 | 0.10 |

|  | Parts by weight | |
|---|---|---|
|  | Run 3 | Run 4 |
| Boosters: |  |  |
| Initiator, percent of original charge | 50 | 50 |
| Time, hours | 9.1 | 20.8 |
|  | 13.1 |  |
|  | 23.3 |  |
| Final time, hours | 29.1 | 30.2 |
| Final conversion, percent | 81 | 45 |
| Final solids, percent | 33 | 22 |

Run 5: A run was made using the recipe for run 3 except that the following boosters were added at 7.1 and 17.2 hours, respectively:

|  | Parts by weight |
|---|---|
| Water | 5.0 |
| Diisopropylbenzene hydroperoxide | 0.0485 |
| Na$_4$P$_2$O$_7$ | 0.068 |
| FeSO$_4$.7H$_2$O | 0.07 |

A 60 percent conversion was obtained in 24.5 hours.

Run 6: A run similar to run 3 was made. It terminated at 25 percent conversion in 17.4 hours.

The following table shows the summary of the six runs.

| Run No. | Water, parts | Methanol, parts | Glycerol, parts | Time, hours | Conversion, percent | Solids,[1] percent | Stability |
|---|---|---|---|---|---|---|---|
| 1 | 106 | 24 | 10 | 18.0 | 77 | 33 | Stable. |
| 2 | 90 | 20 | 10 | 18.0 | 78 | 35 | Do. |
| 3 | 112 | 28 | -- | 27.0 | 81 | 33 | Prefloc. |
| 4 | 96 | 24 | -- | 30.2 | 45 | 22 | Do. |
| 5 | 112 | 28 | -- | 24.5 | 60 | 26 | Do. |
| 6 | 112 | 28 | -- | 17.4 | 25 | 12 | Do. |

[1] Reactor solids before removal of methanol and unreacted monomers.

These data show that the runs containing glycerol gave stable latices and higher conversion rates, and a higher solids content at a given conversion was obtained in the runs containing glycerol than when methanol was used alone.

Various modifications of this invention will be apparent to those skilled in the art upon study of the accompanying disclosure. Such modifications are believed to be clearly within the spirit and the scope of this invention.

We claim:

1. In the emulsion polymerization of a monomeric material comprising an unsaturated organic compound containing an active $CH_2=C<$ group and polymerizable in an aqueous emulsion, the improvement which comprises conducting said polymerization in an aqueous phase ranging from 50 to 160 parts by weight per 100 parts of monomer at a temperature below 0° C. in the presence of an alcohol mixture in an amount sufficient to prevent freezing of said aqueous phase and consisting essentially of a major amount of methanol and a minor amount of at least one polyhydric alcohol selected from the group consisting of glycerol, ethylene glycol, and erythritol.

2. In the emulsion polymerization of a monomeric material comprising an unsaturated organic compound containing an active $CH_2=C<$ group and polymerizable in an aqueous emulsion, the improvement which comprises conducting said polymerization in an aqueous phase ranging from 50 to 160 parts by weight per 100 parts of monomer at a temperature below 0° C. in the presence of 10 to 50 percent by weight of an alcohol mixture, based upon said aqueous phase, and consisting essentially of a polyhydric alcohol selected from the group consisting of glycerol, ethylene glycol and erythritol in a minor amount of said mixture, and methanol in a major amount of said mixture.

3. In the emulsion polymerization of a monomeric material comprising an unsaturated organic compound containing an active $CH_2=C<$ group and polymerizable in an aqueous emulsion, the improvement which comprises conducting said polymerization in an aqueous phase ranging from 50 to 160 parts by weight per 100 parts of monomer at a temperature below 0° C. in the presence of an alcohol mixture in an amount of from 10 to 50 weight percent of said aqueous phase and consisting essentially of between 55 and 90 percent by weight of methanol based on the mixture and a polyhydric alcohol selected from the group consisting of glycerol, ethylene glycol, and erythritol in the range of 10 to 45 percent by weight based upon the mixture.

4. The polymerization of claim 3 wherein said methanol is present in an amount within the range of 65 to 90 weight percent of said alcohol mixture and said polyhydric alcohol is present in an amount of from 10 to 35 weight percent.

5. An improved process for the production of a stable high-solids latex of synthetic rubber, which comprises establishing and maintaining at a polymerization temperature between 0° C. and −40° C. an emulsion of an aqueous phase ranging from 50 to 160 parts by weight per 100 parts of monomer and liquid monomeric material comprising a major amount of 1,3-butadiene and a minor amount of styrene, an alkali metal soap emulsifying agent, an alkyl mercaptan having between 8 and 16 carbon atoms per molecule, an oxidant and a reductant, from 10 to 50 percent by weight, based on said aqueous phase of an alcohol mixture consisting essentially of a polyhydric alcohol selected from the group consisting of glycerol, ethylene glycol and erythritol in an amount of from 10 to 45 weight percent based on said alcohol mixture, and methanol within the range of 55 to 90 percent by weight based on said alcohol mixture.

6. The process of claim 9 wherein said monomeric material comprises butadiene and styrene in a ratio of 20:80 to 95:5 by weight.

7. The process of claim 5 wherein the amount of aqueous phase, including said methanol and said polyhydric alcohol, is not in excess of 125 parts by weight per 100 parts of monomers.

8. The process of claim 5 wherein methanol and unreacted monomers are stripped from said stable latex of synthetic rubber.

9. In the emulsion polymerization of a monomeric material comprising a conjugated diene containing an active $CH_2=C<$ group and polymerizable in an aqueous emulsion, the improvement which comprises conducting said polymerization in an aqueous phase ranging from 50 to 160 parts by weight per 100 parts of monomer at a temperature below 0° C. in the presence of an alcohol mixture in an amount of from 10 to 50 weight percent of said aqueous phase and consisting essentially of between 55 and 90 percent by weight of methanol based on the mixture and a polyhydric alcohol selected from the group consisting of glycerol, ethylene glycol, and erythritol in the range of 10 to 45 percent by weight based upon the mixture.

References Cited in the file of this patent

UNITED STATES PATENTS

| | | |
|---|---|---|
| 2,470,065 | Barnes | May 10, 1949 |
| 2,566,821 | Brown et al. | Sept. 4, 1951 |
| 2,609,366 | Fryling et al. | Sept. 2, 1952 |